(12) United States Patent
Perlman (10) Patent No.: US 9,446,843 B2
(45) Date of Patent: Sep. 20, 2016

(54) ENHANCED PERFORMANCE ROTORCRAFT ROTOR BLADE

(75) Inventor: David L. Perlman, Queen Creek, AZ (US)

(73) Assignee: The Boeing Company, Chicago, IL (US)

( * ) Notice: Subject to any disclaimer, the term of this patent is extended or adjusted under 35 U.S.C. 154(b) by 811 days.

(21) Appl. No.: 13/430,686

(22) Filed: Mar. 27, 2012

(65) Prior Publication Data

US 2013/0259681 A1 Oct. 3, 2013

(51) Int. Cl.
*B64C 27/615* (2006.01)
*B64C 27/72* (2006.01)

(52) U.S. Cl.
CPC ....... *B64C 27/72* (2013.01); *B64C 2027/7266* (2013.01); *Y02T 50/34* (2013.01); *Y10T 29/49336* (2015.01)

(58) Field of Classification Search
CPC ... B64C 27/46; B64C 27/463; B64C 27/615; B64C 27/72; B64C 2027/7261
USPC ............................ 416/1, 23, 24, 87; 244/213
See application file for complete search history.

(56) References Cited

U.S. PATENT DOCUMENTS

| | | | |
|---|---|---|---|
| 2,483,480 A * | 10/1949 | Stalker | 244/17.23 |
| 2,716,460 A * | 8/1955 | Young | 416/24 |
| 3,227,221 A | 1/1966 | You | |
| 5,263,846 A | 11/1993 | Smith | |
| 5,284,419 A | 2/1994 | Lutz | |
| 5,409,183 A | 4/1995 | Gunsallus | |
| 5,518,210 A * | 5/1996 | Friberg | 244/215 |
| 6,135,713 A | 10/2000 | Domzalski et al. | |
| 6,295,006 B1 * | 9/2001 | Kohlhepp | 340/946 |
| 6,478,541 B1 | 11/2002 | Charles et al. | |
| 7,854,594 B2 | 12/2010 | Judge | |
| 2005/0123400 A1 | 6/2005 | Bagai | |
| 2006/0239824 A1 | 10/2006 | Robertson et al. | |

FOREIGN PATENT DOCUMENTS

| | | |
|---|---|---|
| CA | 2505007 A1 | 12/2004 |
| DE | 482607 | 9/1929 |
| EP | 747890 | 4/1956 |
| EP | 1985536 A2 | 10/2008 |

OTHER PUBLICATIONS

Office Action issued in Canadian Patent Application No. 2,798,727 dated Apr. 7, 2015.
Extended European Search Report issued in European Patent Application No. 13160543.8 dated Jun. 8, 2016.

* cited by examiner

*Primary Examiner* — Craig Kim
*Assistant Examiner* — Maxime Adjagbe
(74) *Attorney, Agent, or Firm* — McDonnell Boehnen Hulbert & Berghoff LLP (57) ABSTRACT

An enhanced performance rotorcraft rotor blade system and methods are presented. A rotor blade comprises an inboard blade portion, and at least one controllable surface coupled to the inboard blade portion. The at least one controllable surface is operable to improve a lift of the inboard blade portion by altering an angle of attack of the inboard blade portion independent of the rotor blade.

19 Claims, 10 Drawing Sheets

1102 — PROVIDE A ROTOR BLADE COMPRISING AN INBOARD BLADE PORTION

1104 — PROVIDE AT LEAST ONE CONTROLLABLE SURFACE COUPLED TO THE INBOARD BLADE PORTION AND OPERABLE TO IMPROVE A LIFT OF THE INBOARD BLADE PORTION BY CONTROLLING AN ANGLE OF ATTACK OF THE INBOARD BLADE PORTION INDEPENDENTLY FROM THE ROTOR BLADE

1106 — PROVIDE THE AT LEAST ONE CONTROLLABLE SURFACE COMPRISING AT LEAST ONE OF: A ROTATABLE PORTION OF THE ROTOR BLADE OPERABLE TO ROTATE ABOUT A NEUTRAL AXIS OF THE ROTOR BLADE, A LEADING EDGE FLAP, A TRAILING EDGE FLAP, AN EXTENDABLE FLAP OPERABLE TO INCREASE A DISTANCE FROM A LEADING EDGE TO A TRAILING EDGE OF THE INBOARD PORTION, AND A LEADING EDGE CONTROLLABLE SURFACE COUPLED TO A LEADING EDGE OF THE INBOARD BLADE PORTION AND OPERABLE TO EXPAND TO PROVIDE A LENGTH CHANGE OF AN AIRFOIL SECTION OF THE ROTOR BLADE

*FIG. 11*

ENHANCED PERFORMANCE ROTORCRAFT ROTOR BLADE

FIELD

Embodiments of the present disclosure relate generally to flow over fluid dynamic surfaces. More particularly, embodiments of the present disclosure relate to improving fluid dynamic characteristics of flow over fluid dynamic surfaces.

BACKGROUND

Helicopters have limitations on forward speed substantially due to and resulting in "retreating blade stall" as the helicopter reaches its maximum forward speed. If a retreating blade stalls and doesn't produce sufficient lift, a non-optimal aerodynamic operating condition for the helicopter may result.

SUMMARY

An enhanced performance rotorcraft rotor blade system and methods are disclosed. A rotor blade comprises an inboard blade portion, and at least one controllable surface coupled to the inboard blade portion. The controllable surface is operable to improve a lift of the inboard blade portion by altering an angle of attack of the inboard blade portion independent of the rotor blade.

In this way, various embodiments of the disclosure eliminate or reduce effects of retreating rotor blade stall, and improve forward speed of a rotorcraft. In this manner, lift capabilities on a side of a helicopter increases improving forward speed of the helicopter.

In an embodiment, an enhanced performance rotorcraft rotor blade system comprises a rotor blade and at least one controllable surface. The rotor blade comprises an inboard blade portion. The controllable surface is coupled to the inboard blade portion and improves a lift of the inboard blade portion by altering an angle of attack of the inboard blade portion independent of the rotor blade.

In another embodiment, a method for operating an enhanced performance rotorcraft rotor blade system to reduce effects of retreating rotor blade stall detects a high directional velocity of a rotorcraft comprising a rotor blade. The method further deploys at least one controllable surface coupled to an inboard blade portion of the rotor blade located in a low velocity region of the rotor blade.

In a further embodiment, a method for providing a rotor blade provides a rotor blade comprising an inboard blade portion. The method further provides at least one controllable surface coupled to the inboard blade portion and operable to improve a lift of the inboard blade portion by controlling an angle of attack of the inboard blade portion independently from the rotor blade.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, fluid dynamics, structures, control surfaces, manufacturing, and other functional aspects of the systems (and the individual operating components of the systems) may not be described in detail herein. In addition, those skilled in the art will appreciate that embodiments of the present disclosure may be practiced in conjunction with a variety of structural bodies, and that the embodiments described herein are merely example embodiments of the disclosure.

Embodiments of the disclosure are described herein in the context of a practical non-limiting application, namely, a helicopter blade. Embodiments of the disclosure, however, are not limited to such a helicopter blade applications, and the techniques described herein may also be utilized in other fluid dynamic surface applications. For example, embodiments may be applicable to other lift surfaces of an aircraft such as a flap or a tail, a control surface of an aircraft such as an elevator and an aileron, an engine strut, a wind turbine blade, a hydrodynamic surface utilizing liquid (e.g., water) instead of air, a sail boat sail, an engine propeller, a windmill, and other application.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
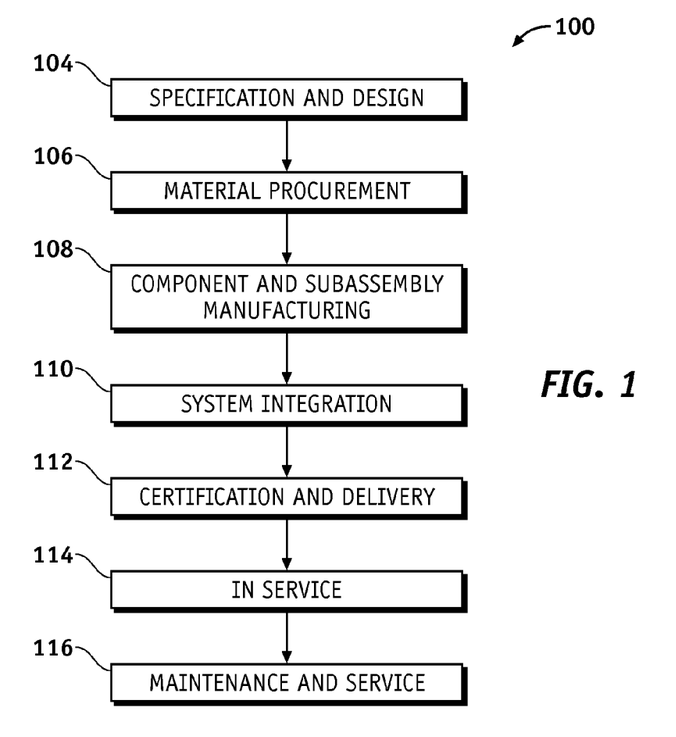
FIG. 1 is an illustration of a flow diagram of an exemplary aircraft production and service methodology.
Figure 2:
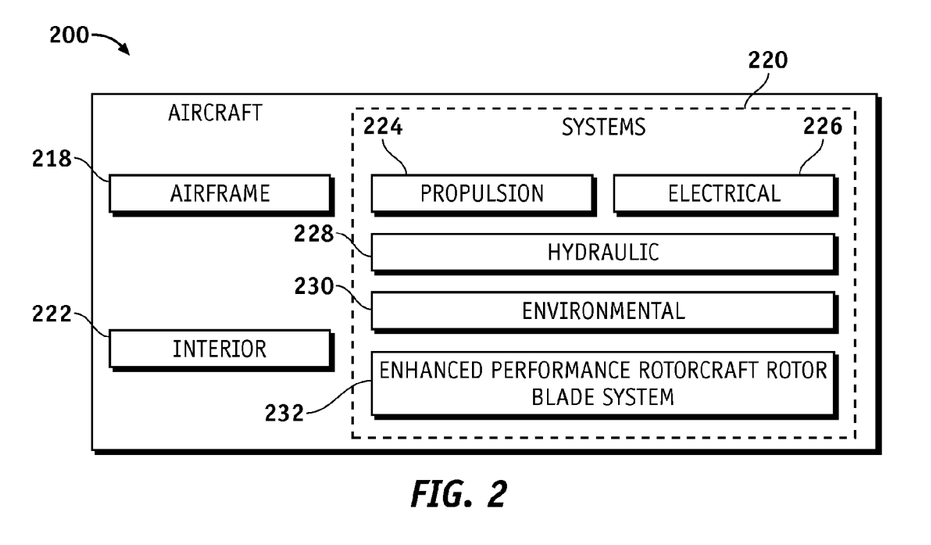
FIG. 2 is an illustration of an exemplary block diagram of an aircraft.

Referring more particularly to the drawings, embodiments of the disclosure may be described in the context of an aircraft manufacturing and service method 100 (method 100) as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220 and an interior 222. Examples of high-level systems 220 include one or more of a propulsion system 224, an electrical system 226, a hydraulic system 228, an environmental system 230, and an enhanced performance rotorcraft rotor blade system 232. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

Embodiments of the disclosure eliminate or reduce effects of retreating rotor blade stall, and improve forward speed of a rotorcraft. In this manner, lift capabilities on a side of a helicopter increases improving forward speed of the helicopter. More thrust can be generated in the overall rotor system if a possibility of rotor blade stall is eliminated or reduced.

Figure 3:
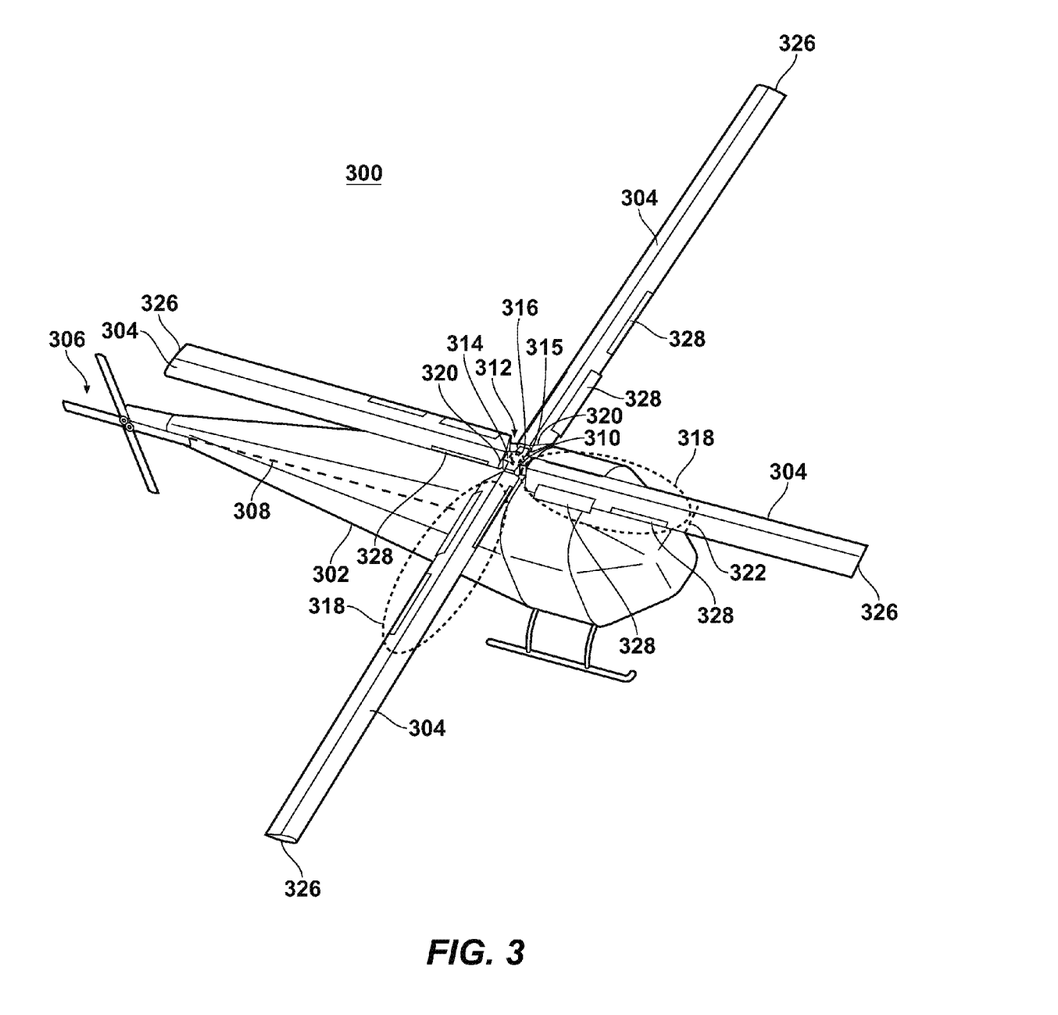
FIG. 3 is an illustration of a perspective view of an exemplary helicopter main rotor according to an embodiment of the disclosure.

FIG. 3 is an illustration of a perspective view of an exemplary helicopter main rotor 300 according an embodiment of the disclosure. The helicopter main rotor 300 or rotor system 300 is a type of a fan that is used to generate both an aerodynamic lift force that supports the weight of the helicopter 302, and thrust which counteracts aerodynamic drag in forward flight. Each (main) rotor blade 304 is mounted on a spar 310 coupled to a main rotor shaft 316, as opposed to a helicopter tail rotor 306 which is connected through a combination of drive shaft(s) and gearboxes along a tail boom 308. The helicopter 302 generally comprises a plurality of rotor blades 304 projecting out of a main rotor hub 312 which may have an aerodynamic cover 314. The blade pitch is typically controlled by a swash plate 315 connected between the rotor blades 304 and helicopter flight controls.

A typical helicopter rotor blade is a one piece homogenous unit and fixed to the main rotor hub 312 which is connected to the main rotor shaft 316. Many parts may comprise a one piece blade that may be, for example but without limitation, straight, have a twist from a blade root area 320 to a tip 326, or other blade configuration. In operation, the rotor blade 304 rotates about a center point namely the main rotor shaft 316 (axis of rotation 316). Mechanically, in operation an angle of attack of the rotor blade 304 is changed to increase or decrease lift and thrust. With the angle of attack reduced on a retreating blade to prevent stall, lift is also generally reduced, which can have an effect almost as if stalled, since high angles of attack generally promote a stall.

Since the rotor blades 304 rotate in a radial pattern, the tip 326 at an outmost point (e.g., outmost from the main rotor shaft 316) of the rotor blades 304 obtain a rotational or tangential velocity far greater than an inner most portion 318 (inboard blade portion 318) of the rotor blades 304 closest to the main rotor shaft 316. The linear velocity of a point on the rotor blade 304 at a distance from the axis of rotation 316 represents the rotational or tangential velocity of that point. Tangential or rotational velocity is lower on the inner most portion 318 (inboard) location of the rotor blade 304 in comparison with the tip 326 (outboard) location on the same rotor blade 304. At high forward speeds when an angle of rotation of the rotor blade 304 is retreating, an angle of attack of the rotor blade 304 is generally reduced overall. According to embodiments of the disclosure, if the angle of attack of the rotor blade 304 is reduced overall and if an angle of attack of another portion of the rotor blade 304 is increased (e.g., in the blade root area 320 and/or midsection 322), lift can still be generated, maintaining lift and controllability on that side. A change in angle of attack may be introduced, for example, about 90 degrees prior to when an effect of the angle of attack is required.

Embodiments of the disclosure provide controllable surfaces 328 as enhancements to separate portions of the rotor blade 304. As explained in more detail below, the controllable surfaces 328 move/rotate independent of the entire rotor blade 304 to improve lift at the slower inboard portions of the rotor blade 304 such as the inboard blade portion 318, which comprises the inner most portion of the rotor blade 304.

Figure 4:
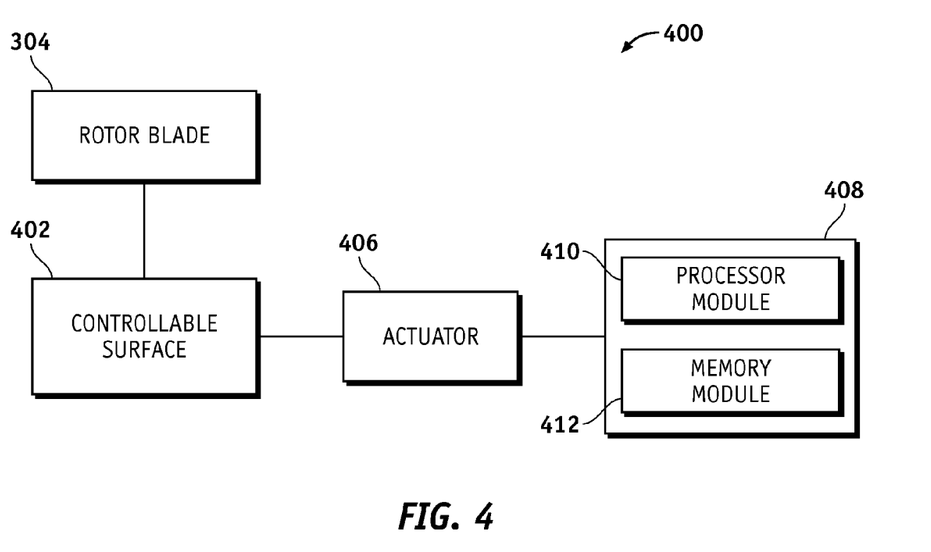
FIG. 4 is an illustration of an exemplary functional block diagram of an enhanced performance rotorcraft rotor blade system according to an embodiment of the disclosure.

FIG. 4 is an illustration of an exemplary functional block diagram of an enhanced performance rotorcraft rotor blade system 400 (system 400) according to an embodiment of the disclosure. The system 400 may comprise the rotor blade 304, a controllable surface 402, an actuator 406, and a controller 408. FIG. 4 is explained in additional detail below in conjunction with FIG. 3.

The controllable surface 402 (328 in FIG. 3) is coupled to the inboard blade portion 318 (FIG. 3) of the rotor blade 304 and is configured to improve a lift of the inboard blade portion 318 by altering an angle of attack of the inboard blade portion 318 independent of the rotor blade 304. Embodiments of the disclosure provide various controllable surfaces such as the controllable surface 402 as enhancements to separate portions of the rotor blade 304 as explained below in the context of discussion of FIGS. 5-9.

The actuator 406 is operable to vary a position (i.e., bend, deflect, change shape) of the controllable surface 402 in response to an actuation command. The actuation command may be generated by an input from a pilot/operator, a preprogrammed input from the processor module 410 of the controller 408 in case of automated control, or a combination thereof. In this manner, the controllable surface 402 moves/rotates independent of the entire rotor blade 304 to improve lift at the slower inboard portions of the blade such as the inner most portion 318 as explained in more detail below in the context of discussion of FIGS. 5-9.

In one embodiment, the actuator 406 is controlled via a control mechanism by the controller 408 to control a position of the controllable surface 402 based on various operation conditions as explained below. In another embodiment, the controller 408 may include or be realized as a controller (connected to the aircraft systems), to facilitate controlling a position (e.g., extend, rotate, and move up or down) of the controllable surface 402.

Any actuator known to those skilled in the art may be used for actuation of the controllable surface 402. For example but without limitation, a hydraulic actuator, a piezoelectric actuator, a spring loaded mechanism, a reverse flow blocking mechanism, a pyrotechnic actuator, a shape memory alloy actuator, or other actuator may be used.

The controller 408 may comprise, for example but without limitation, a processor module 410, a memory module 412, and other module. The controller 408 may be implemented as, for example but without limitation, a part of an aircraft system, a centralized aircraft processor, a subsystem computing module devoted to the an enhanced performance rotorcraft rotor blade system 400, or other implementation.

The controller 408 is configured to control the actuator 406 to vary a position of the controllable surface 402 according to various operation conditions. The operation conditions may comprise, for example but without limitation, flight conditions, or other condition. The flight conditions may comprise, for example but without limitation, take off, cruise, approach, landing, or other flight condition. Thus, the operation conditions, may comprise for example but without limitation, an altitude, an airspeed, a Mach number, a temperature, or other parameter. The controller 408, may be located remotely from the actuator 406, or may be coupled to the actuator 406.

The processor module 410 comprises processing logic that is configured to carry out the functions, techniques, and processing tasks associated with the operation of the system 400. In particular, the processing logic is configured to support the system 400 described herein. For example, the processor module 410 may direct the actuator 406 to vary a position of the controllable surface 402 based on various flight conditions. The processor may direct the actuator 406 to move at least one controllable surface 402 in response to an input from a pilot/operator or a preprogrammed input from the processor module 410.

In operation, the processor module 410 detects a high directional velocity of the helicopter 302 (FIG. 3) comprising the rotor blade 304. A high directional velocity is defined where the helicopter 302 is airborne, may be hovering in place, and is directionally advancing or maintaining position at an air speed that may result in retreating blade stall. The processor module 410 then directs the actuator 406 to deploy/activate at least one controllable surface 402 coupled to the inboard blade portion 318 of the rotor blade 304 located in a region of a low rotational or tangential velocity region of the rotor blade 304. In this manner, lift at the inboard blade portion 318 is improved by controlling an angle of attack of the inboard blade portion 318 independently from the rotor blade 304. The process module 410 may control the angle of attack based on a rotation angle of the rotor blade 304.

The processor module 410 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 412 may comprise a data storage area with memory formatted to support the operation of the system 400. The memory module 412 is configured to store, maintain, and provide data as needed to support the functionality of the system 400. For example, the memory module 412 may store flight configuration data, actuator command signals, or other data.

In practical embodiments, the memory module 412 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 412 may be coupled to the processor module 410 and configured to store, for example but without limitation, a database, and the like. Additionally, the memory module 412 may represent a dynamically updating database containing a table for updating the database, and the like. The memory module 412 may also store, a computer program that is executed by the processor module 410, an operating system, an application program, tentative data used in executing a program, or other application.

The memory module 412 may be coupled to the processor module 410 such that the processor module 410 can read information from and write information to the memory module 412. For example, the processor module 410 may access the memory module 412 to access an aircraft speed, a flight control surface position, an angle of attack, a Mach number, an altitude, or other data.

As an example, the processor module 410 and memory module 412 may reside in respective application specific integrated circuits (ASICs). The memory module 412 may also be integrated into the processor module 410. In an embodiment, the memory module 412 may comprise a cache memory for storing temporary variables or other intermediate information during execution of instructions to be executed by the processor module 410.

Figure 5:
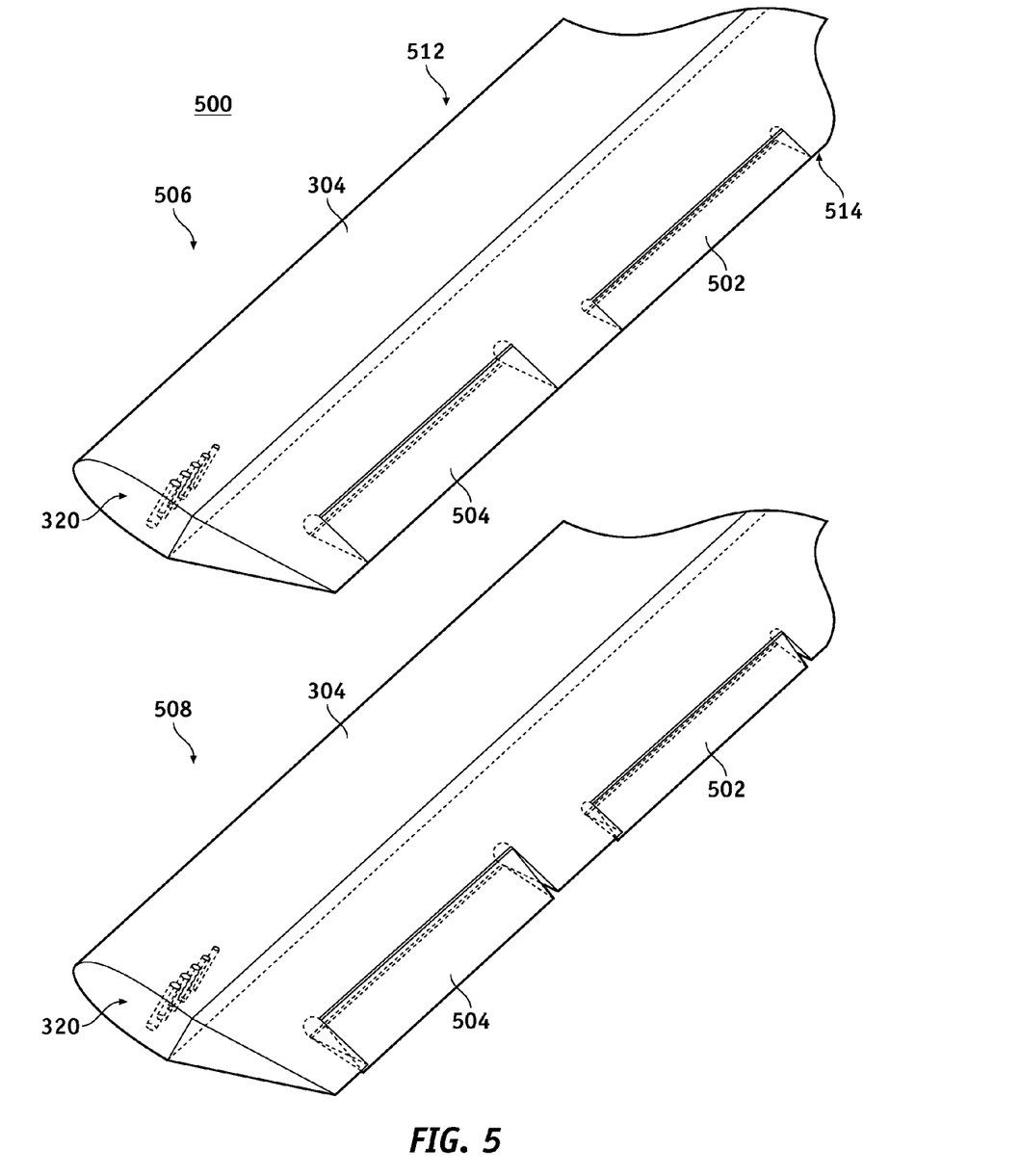
FIG. 5 is an illustration of an exemplary perspective view of a rotor blade structure comprising trailing edge flaps as controllable surfaces according to an embodiment of the disclosure.

FIG. 5 is an illustration of an exemplary perspective view of a rotor blade structure 500 comprising two flaps such as a trailing edge flap 502 and a trailing edge flap 504 used as controllable surfaces and shown at a neutral position 506 and at an actuated position 508 respectively according an embodiment of the disclosure. The trailing edge flap 502 comprises an inboard flap and the trailing edge flap 504 comprises a mid-span flap each coupled to the rotor blade 304 at the inboard blade portion 318 (FIG. 3) respectively. The trailing edge flaps 502 and 504 are each configured to move up or down changing an angle of attack from a leading edge 512 to a trailing edge 514. A range of movement of each of the trailing edge flaps 502 and 504 may be, for example but without limitation, about 2 degrees to about 5 degrees (e.g., relative to the rotor blade 304), about 0 degrees to about 5 degrees, about −5 degrees to about 5 degrees (i.e., for moving in both directions), or other suitable range of movement.

Figure 6:
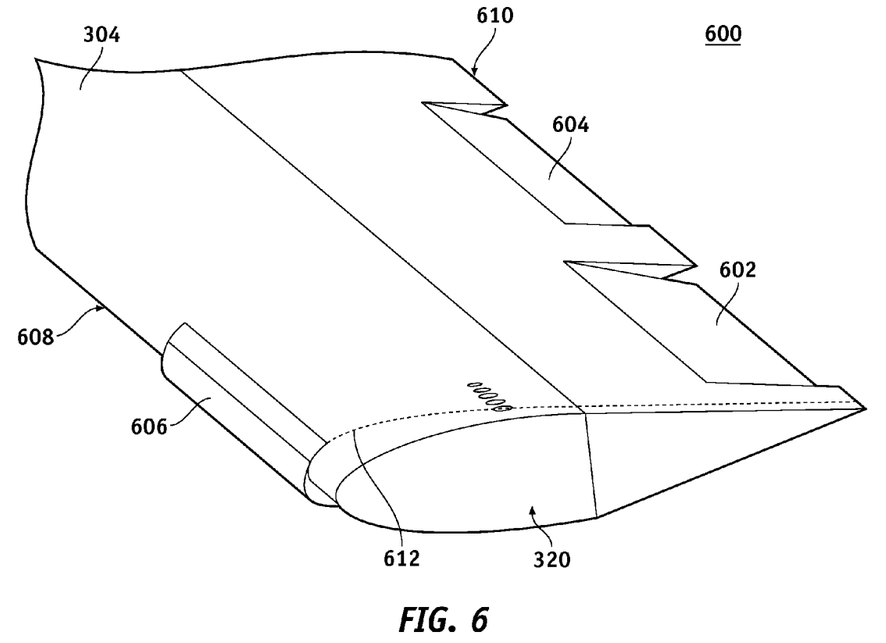
FIG. 6 is an illustration of an exemplary perspective view of a rotor blade structure comprising trailing edge flaps and a leading edge control surface as controllable surfaces according to an embodiment of the disclosure.

FIG. 6 is an illustration of an exemplary perspective view of a rotor blade structure 600 comprising a trailing edge flap 602, a trailing edge flap 604 and a leading edge controllable surface 606 used as controllable surfaces according an embodiment of the disclosure. The trailing edge flap 602 comprises an inboard flap and the trailing edge flap 604 comprises a mid-span flap each coupled to a trailing edge 610 of the rotor blade 304 at the inboard blade portion 318 respectively. The trailing edge flaps 602 and 604 are each configured to move up or down changing the angle of attack from a leading edge 608 to the trailing edge 610. A range of movement of each of the trailing edge flaps 602 and 604 may comprise, for example but without limitation, about 2 degrees to about 5 degrees (e.g., relative to the rotor blade 304), about 0 degrees to about 5 degrees, about −5 degrees to about 5 degrees (i.e., for moving in both directions), or other suitable range of movement.

The leading edge controllable surface 606 is coupled to the leading edge 608 of the rotor blade 304 at the inboard blade portion 318. The leading edge controllable surface 606 is configured to extend to provide a length change of an airfoil section 612 of the rotor blade 304. The length change increases a distance (chord) from the leading edge 608 to the trailing edge 610 of the rotor blade 304 in an area near the blade root area 320 of the rotor blade 304, much the same in shape as, for example, a fowler flap. A range of movement of the leading edge controllable surface 606 may comprise, for example but without limitation, about 2 degrees to about 5 degrees (e.g., relative to the rotor blade 304), about 0 degrees to about 5 degrees, about −5 degrees to about 5 degrees (i.e., for moving in both directions), or other suitable range of movement.

Figure 7:
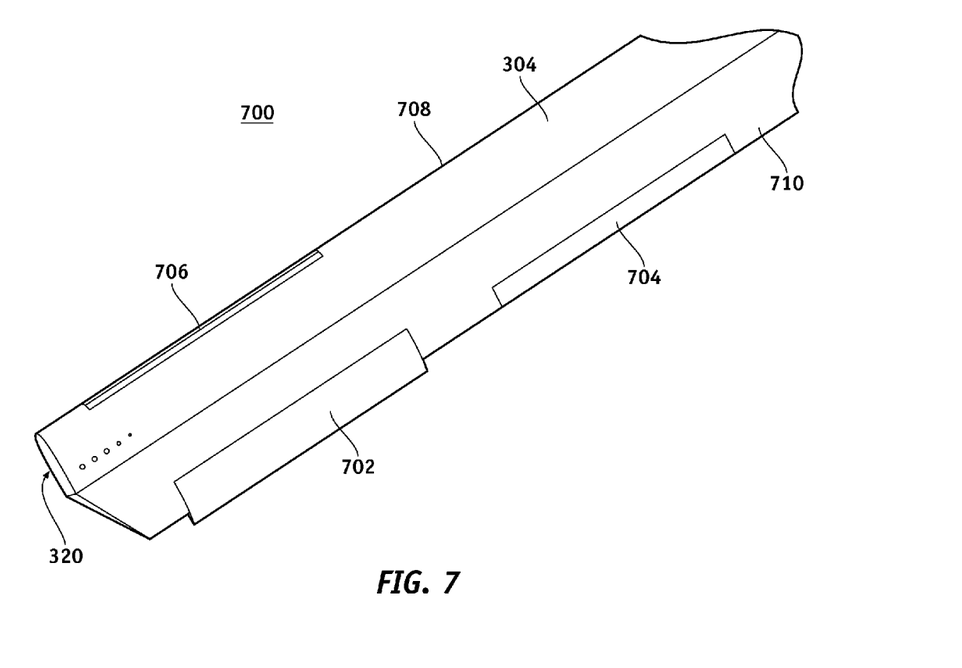
FIG. 7 is an illustration of an exemplary perspective view of a rotor blade structure comprising a trailing edge extendable flap, a trailing edge flap, and a leading edge flap as controllable surfaces according to an embodiment of the disclosure.

FIG. 7 is an illustration of an exemplary perspective view of a rotor blade structure 700 comprising a trailing edge extendable flap 702, a trailing edge flap 704, and a leading edge flap 706 used as controllable surfaces according an embodiment of the disclosure.

The trailing edge extendable flap 702 comprises an inboard extendable flap and the trailing edge flap 704 comprises a mid-span flap each coupled to a trailing edge 710 of the rotor blade 304 at the inboard blade portion 318 respectively. The trailing edge extendable flap 702 increases a distance from the leading edge 708 to the trailing edge 710 of the inboard blade portion 318.

The trailing edge extendable flap 702 is configured to extend through displacement rather than rotation. A range of displacement of the trailing edge extendable flap 702 may comprise, for example but without limitation, about 2 inches to about 5 inches (e.g., relative to the rotor blade 304), about 0 inches to about 5 inches, or other suitable range of displacement.

The trailing edge flap 704 is configured to rotate up and down. A range of rotation of the trailing edge flap 704 may comprise, for example but without limitation, about 2 degrees to about 5 degrees, or other suitable range of rotation.

The leading edge flap 706 is coupled to a leading edge 708 of the rotor blade 304 at the inboard blade portion 318 and is configured to rotate up and down. A range of rotation of the leading edge flap 706 may comprise, for example but without limitation, about 2 degrees to about 5 degrees (e.g., relative to the rotor blade 304), about 0 degrees to about 5 degrees, about −5 degrees to about 5 degrees (i.e., for moving in both directions), or other suitable range of rotation.

Figure 8:
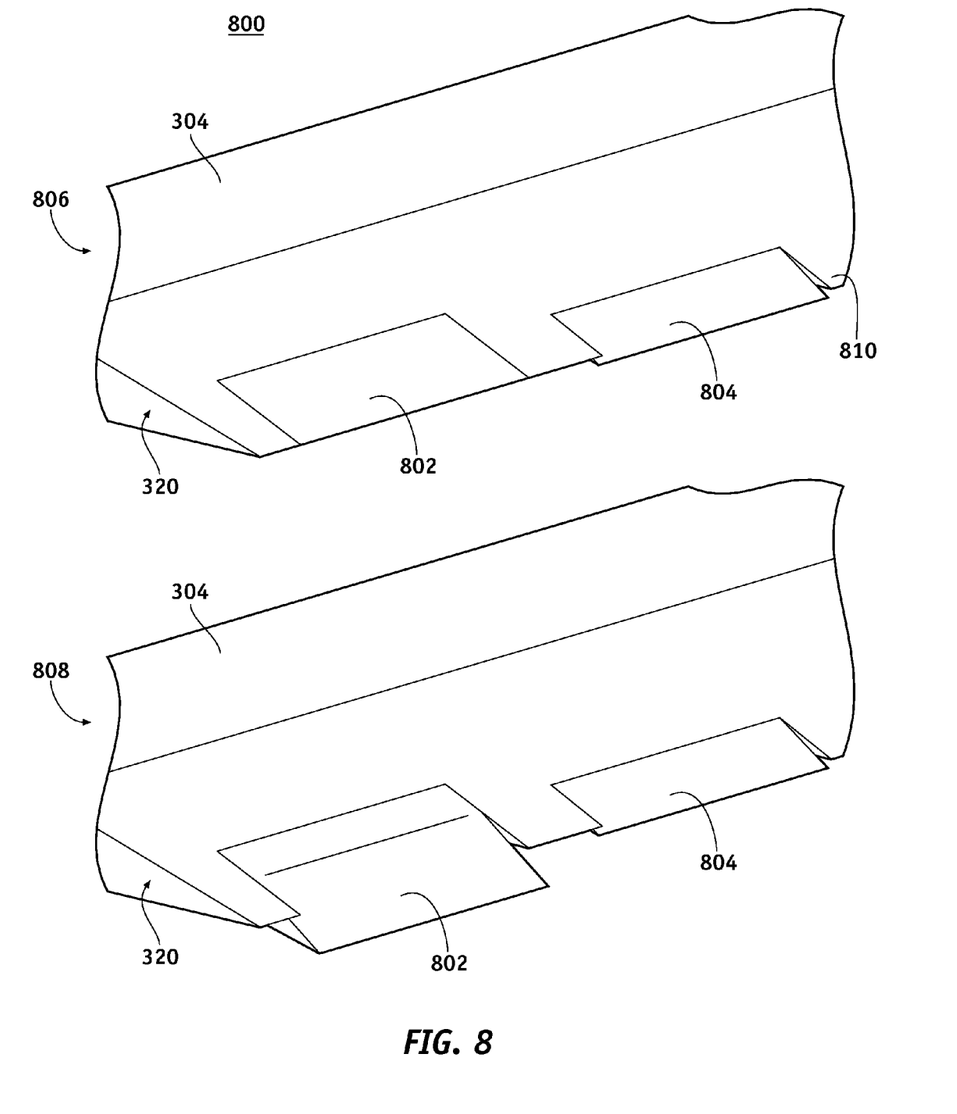
FIG. 8 is an illustration of an exemplary perspective view of a rotor blade structure comprising a trailing edge extendable flap, and a trailing edge flap as controllable surfaces according to an embodiment of the disclosure.

FIG. 8 is an illustration of an exemplary perspective view of a rotor blade structure 800 comprising a trailing edge extendable flap 802, and a trailing edge flap 804 used as controllable surfaces and shown at positions 806 and 808 respectively according an embodiment of the disclosure. The trailing edge extendable flap 802 comprises an inboard extendable flap and the trailing edge flap 804 comprises a mid-span flap each coupled to a trailing edge 810 of the rotor blade 304 at the inboard blade portion 318 respectively.

The positions 806 and 808 show the trailing edge extendable flap 802 at a retracted position and at an extended position respectively. The trailing edge extendable flap 802 extends through displacement rather than rotation. A range of displacement of the trailing edge extendable flap 802 may comprise, for example but without limitation, about 2 inches to about 5 inches (e.g., relative to the rotor blade 304), about 0 inches to about 5 inches, or other suitable range of displacement.

The trailing edge flap 804 is configured to rotate up and down. A range of rotation of the trailing edge flap 804 may comprise, for example but without limitation, about 2 degrees to about 5 degrees (e.g., relative to the rotor blade 304), about 0 degrees to about 5 degrees, about −5 degrees to about 5 degrees (i.e., for moving in both directions), or other suitable range of rotation.

Figure 9:
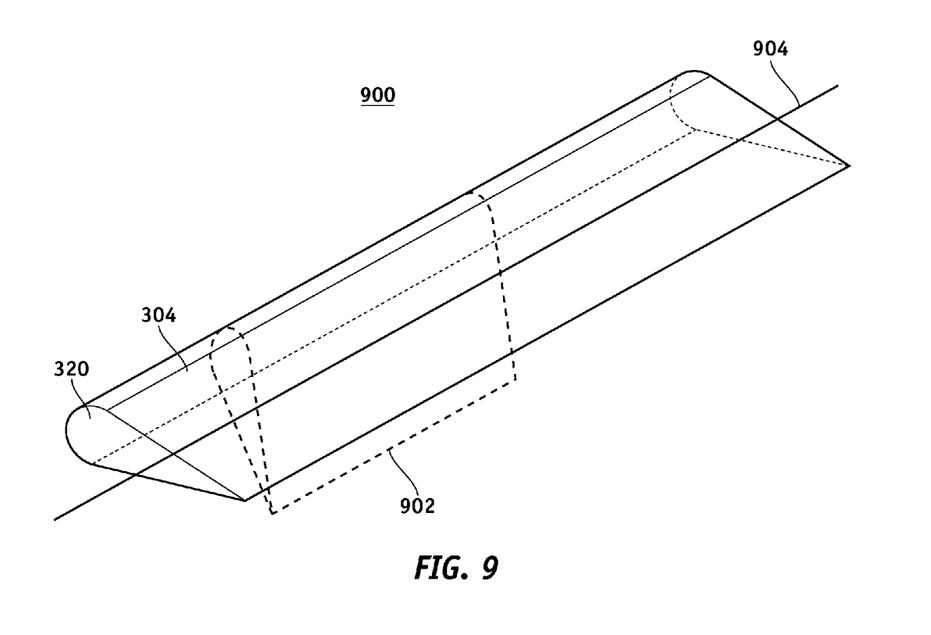
FIG. 9 is an illustration of an exemplary perspective view of a rotor blade comprising a controllable surface according to an embodiment of the disclosure.

FIG. 9 is an illustration of an exemplary rotor blade 900 comprising a controllable surface 902 according an embodiment of the disclosure.

The controllable surface 902 comprises a portion of the rotor blade 304 at the inboard blade portion 318, and rotates up or down about a neutral axis 904 of the rotor blade 304.

Figure 10:
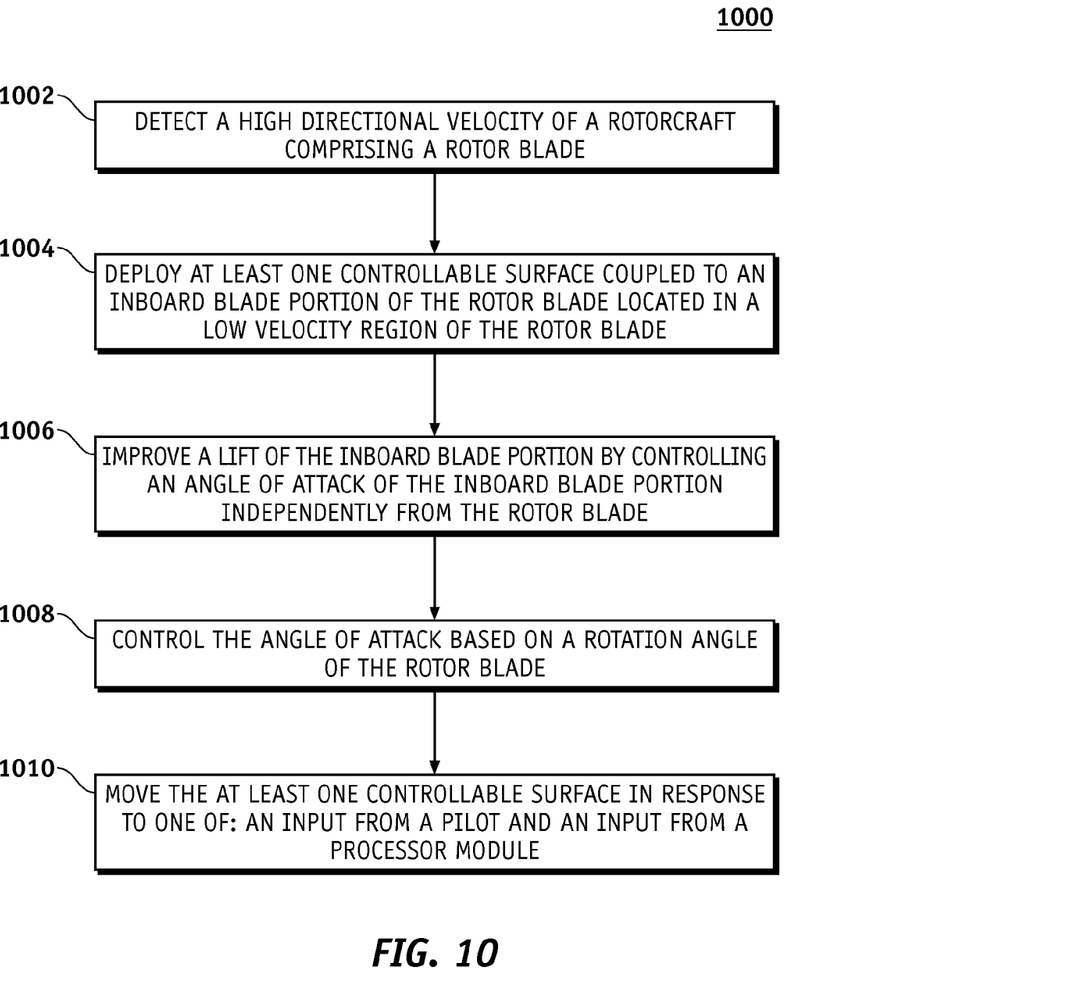
FIG. 10 is an illustration of an exemplary flowchart showing a process for operating an enhanced performance rotorcraft rotor blade system according to an embodiment of the disclosure.

FIG. 10 is an illustration of an exemplary flowchart showing a process 1000 for operating the enhanced performance rotorcraft rotor blade system 400 according to an embodiment of the disclosure. The various tasks performed in connection with the process 1000 may be performed mechanically, by software, hardware, firmware, or any combination thereof. For illustrative purposes, the following description of the process 1000 may refer to elements mentioned above in connection with FIGS. 3-9. In practical embodiments, portions of the process 1000 may be performed by the rotor blade 304, the controllable surface 402, the actuator 406, the controller 408, etc. Process 1000 may have functions, material, and structures that are similar to the embodiments shown in FIGS. 3-9. Therefore, common features, functions, and elements may not be redundantly described here.

Process 1000 may begin by a controller such as the controller 408 detecting a high directional velocity of a rotorcraft such as the helicopter 302 comprising a rotor blade such as the rotor blade 304 (task 1002). As mentioned above, a high directional velocity is defined where the helicopter 302 is airborne, may be hovering in place, and is directionally advancing or maintaining position at an air speed that may result in retreating blade stall. The high directional velocity may comprise, for example, a velocity in a direction that is sufficient to induce a velocity differential in a plane of rotation of the rotor blade 304.

Process 1000 may continue by deploying at least one controllable surface such as the controllable surface 328/402 coupled to an inboard blade portion such as the inboard blade portion 318 of the rotor blade 304 located in a low velocity region of the rotor blade 304 (task 1004). The low velocity region may comprise, for example, a region of a plane of rotation of the rotor blade 304 where velocity is near a stall speed of the rotor blade 304. The low velocity region may comprise, for example, a rotational velocity region, a tangential velocity region, or other low velocity region.

Process 1000 may continue by improving a lift of the inboard blade portion 318 by controlling an angle of attack of the inboard blade portion 318 independently from the rotor blade 304 (task 1006).

Process 1000 may continue by the controller 408 controlling the angle of attack based on a rotation angle of the rotor blade 304 (task 1008).

Process 1000 may continue by moving the controllable surface 328/402 in response to one of: an input from a pilot and an input from a processor module such as the processor module 410 (task 1010).

Figure 11:
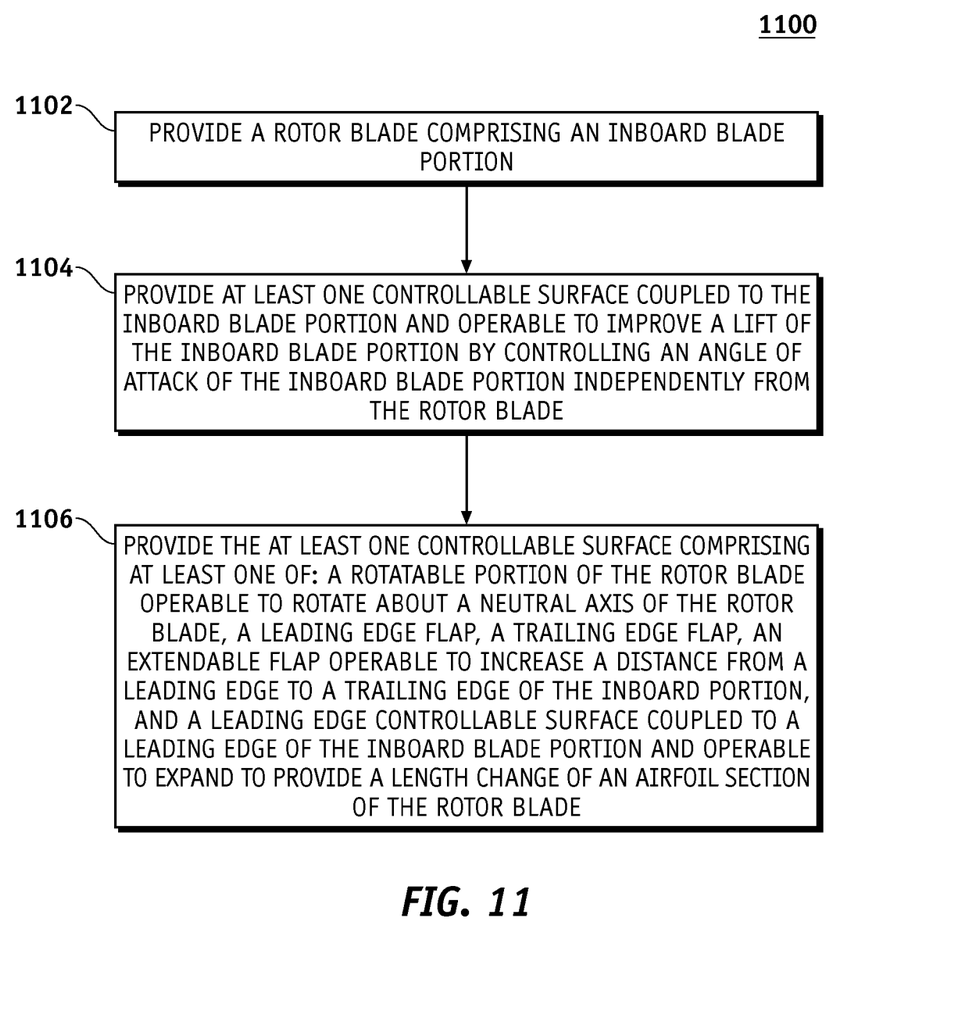
FIG. 11 is an illustration of an exemplary flowchart showing a process for providing an enhanced performance rotorcraft rotor blade according to an embodiment of the disclosure.

FIG. 11 is an illustration of an exemplary flowchart showing a process for providing the enhanced performance rotorcraft rotor blade according to an embodiment of the disclosure. The various tasks performed in connection with the process 1100 may be performed mechanically, by software, hardware, firmware, or any combination thereof. For illustrative purposes, the following description of the process 1100 may refer to elements mentioned above in connection with FIGS. 3-9. In practical embodiments, portions of the process 1100 may be performed by the rotor blade 304, the controllable surface 402, the actuator 406, the controller 408, etc. Process 1100 may have functions, material, and structures that are similar to the embodiments shown in FIGS. 3-9. Therefore, common features, functions, and elements may not be redundantly described here.

Process 1100 may begin by providing a rotor blade such as the rotor blade 304 comprising an inboard blade portion such as the inboard blade portion 318 (task 1102).

Process 1100 may continue by providing at least one controllable surface such as the controllable surface 402 coupled to the inboard blade portion 318 and operable to improve a lift of the inboard blade portion 318 by controlling an angle of attack of the inboard blade portion 318 independently from the rotor blade 304 (task 1104).

Process 1100 may continue by providing the controllable surface 402 comprising, for example but without limitation, a rotatable portion of the rotor blade 304 operable to rotate about a neutral axis such as the a neutral axis of the rotor blade 304, a leading edge flap 706, a trailing edge flap 502/504/602/604, a trailing edge extendable flap 702 operable to increase a distance from a leading edge 708 to a trailing edge 710 of the inboard portion 318, and a leading edge controllable surface 606 coupled to a leading edge 608 of the inboard blade portion 318 and operable to expand to provide a length change of an airfoil section 612 of the rotor blade 304 (task 1106).

In this way, various embodiments of the disclosure eliminate or reduce effects of retreating rotor blade stall, and improve forward speed of a rotorcraft. In this manner, lift capabilities on a side of a helicopter increases improving forward speed of the helicopter.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3-9 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated.

The invention claimed is:

1. An enhanced performance rotorcraft rotor blade system for a rotorcraft, the system comprising:
   a rotor blade comprising a blade tip and an inboard blade portion;
   a swash plate configured to control a pitch of the entire rotor blade; and
   at least one controllable surface coupled to the inboard blade portion in a region of low tangential velocity away from the blade tip, wherein the at least one controllable surface is movable to change the position of the at least one controllable surface to improve a lift of the inboard blade portion, wherein the at least one controllable surface is configured to move independent of motion of the entire rotor blade controlled by the swash plate;
   wherein the enhanced performance rotorcraft rotor blade system is configured to:
   (i) detect a high directional velocity of the rotorcraft, wherein detecting the high directional velocity comprises detecting that the rotorcraft is advancing at a high forward speed that results in retreating blade stall; and
   (ii) in response to detecting the high directional velocity, (a) control the swash plate to reduce the angle of attack of the entire rotor blade when the rotor blade is retreating and (b) deploy the at least one controllable surface to improve a lift of the inboard blade portion when the rotor blade is retreating by (1) increasing an angle of attack of the inboard blade portion independent of the swash plate reducing the angle of attack of the entire rotor blade or (2) extending the at least one controllable surface to increase a distance from a leading edge to a trailing edge of the inboard blade portion.

2. The enhanced performance rotorcraft rotor blade system of claim 1, wherein the at least one controllable surface comprises one of: a flap and an extendable flap.

3. The enhanced performance rotorcraft rotor blade system of claim 2, wherein the extendable flap increases a distance from a leading edge to a trailing edge of the inboard blade portion.

4. The enhanced performance rotorcraft rotor blade system of claim 2, wherein the flap is coupled to one of: a leading edge of the inboard blade portion, and a trailing edge of the inboard blade portion.

5. The enhanced performance rotorcraft rotor blade system of claim 1, wherein the at least one controllable surface comprises a rotatable portion of the rotor blade operable to rotate about a neutral axis of the rotor blade.

6. The enhanced performance rotorcraft rotor blade system of claim 1, further comprising a processor module operable to control the angle of attack of the at least one controllable surface.

7. The enhanced performance rotorcraft rotor blade system of claim 6, wherein the processor module is further operable to control the angle of attack based on a rotation angle of the rotor blade.

8. The enhanced performance rotorcraft rotor blade system of claim 6, wherein:
   the rotor blade comprises a plurality of controllable surfaces; and
   the processor module is operable to alter the angle of attack independently for each of the controllable surfaces.

9. The enhanced performance rotorcraft rotor blade system of claim 6, wherein the processor module is further operable to control the angle of attack of the at least one controllable surface in response to one of: an input from a pilot and an input from the processor module.

10. The enhanced performance rotorcraft rotor blade system of claim 1, wherein the at least one controllable surface comprises:
    a flap coupled to a trailing edge of the inboard blade portion; and
    an extendable flap coupled to the trailing edge of the inboard blade portion.

11. The enhanced performance rotorcraft rotor blade system of claim 10, wherein the at least one controllable surface further comprises a leading edge flap coupled to a leading edge of the inboard blade portion.

12. The enhanced performance rotorcraft rotor blade system of claim 1, wherein the at least one controllable surface comprises:
    a leading edge controllable surface coupled to a leading edge of the inboard blade portion and operable to extend a chord of the rotor blade to provide a length change of an airfoil section of the rotor blade in an area near a root of the rotor blade.

13. The enhanced performance rotorcraft rotor blade system of claim 1, wherein the at least one controllable surface further comprises two flaps coupled to a trailing edge of the inboard blade portion.

14. A method for operating an enhanced performance rotorcraft rotor blade system to reduce effects of retreating rotor blade stall, the method comprising:
    detecting a high directional velocity of a rotorcraft comprising a rotor blade and a swash plate, the rotor blade comprising an inboard blade portion and a blade tip, and the swash plate configured to control a pitch of the entire rotor blade, wherein detecting the high directional velocity comprises detecting a high forward speed of the rotorcraft that results in retreating blade stall; and
    in response to detecting the high directional velocity of the rotorcraft:
    (i) the swash plate reducing an angle of attack of the entire rotor blade when the rotor blade is retreating;

(ii) deploying at least one controllable surface coupled to the inboard blade portion of the rotor blade located in a low velocity region of the rotor blade and away from the blade tip to improve a lift of the inboard blade portion when the rotor blade is retreating by (a) increasing an angle of attack of the inboard blade portion independent of the swash plate reducing the angle of attack of the entire rotor blade or (b) extending the at least one controllable surface to increase a distance from a leading edge to a trailing edge of the inboard blade portion; and (iii) moving the at least one controllable surface independent of motion of the entire rotor blade controlled by the swash plate to reduce an angle of attack of the entire rotor blade when the rotor blade is retreating.

15. The method of claim 14, further comprising moving the at least one controllable surface in response to one of: an input from a pilot, and an input from a processor module.

16. A method comprising:

configuring a rotor blade comprising a blade tip and an inboard blade portion in a region of low tangential velocity of the rotor blade;

configuring a swash plate to control a pitch of the entire rotor blade;

configuring the swash plate to reduce an angle of attack of the entire rotor blade when the rotor blade is retreating so as to alter a lift and a thrust of the entire rotor blade;

coupling at least one controllable surface to a leading edge of the inboard blade portion in the region of low tangential velocity away from the blade tip; and configuring the at least one controllable surface to improve a lift of the inboard blade portion in the region of low tangential velocity when the rotor blade is retreating by increasing an angle of attack of the inboard blade portion independent of the swash plate reducing the angle of attack of the entire rotor blade when the rotor blade is retreating;

configuring a rotorcraft to (i) detect a high directional velocity of the rotorcraft, wherein detecting the high directional velocity comprises detecting that the rotorcraft is advancing at a high forward speed that results in retreating blade stall and (ii) in response to detecting the high directional velocity, (a) control the swash plate to reduce the angle of attack of the entire rotor blade when the rotor blade is retreating, and (b) deploy the at least one controllable surface to improve a lift of the inboard blade portion when the rotor blade is retreating by increasing an angle of attack of the inboard blade portion independent of the swash plate reducing the angle of attack of the entire rotor blade.

17. The method of claim 16, further comprising configuring the at least one controllable surface to comprise a rotatable portion of the rotor blade operable to rotate about a neutral axis of the rotor blade.

18. The method of claim 16, further comprising configuring the at least one controllable surface to comprise a leading edge controllable surface coupled to the leading edge of the inboard blade portion and configured to extend a chord of the rotor blade to provide a length change of an airfoil section of the rotor blade in an area near a root of the rotor blade.

19. The enhanced performance rotorcraft rotor blade system of claim 1, further comprising processing logic configured to direct an actuator to vary a position of the at least one controllable surface based on various flight conditions during flight.

* * * * *